P. HOGAN.
TERMINAL BOX.
APPLICATION FILED JAN. 28, 1911.
1,041,473.
Patented Oct. 15, 1912.
2 SHEETS—SHEET 2.
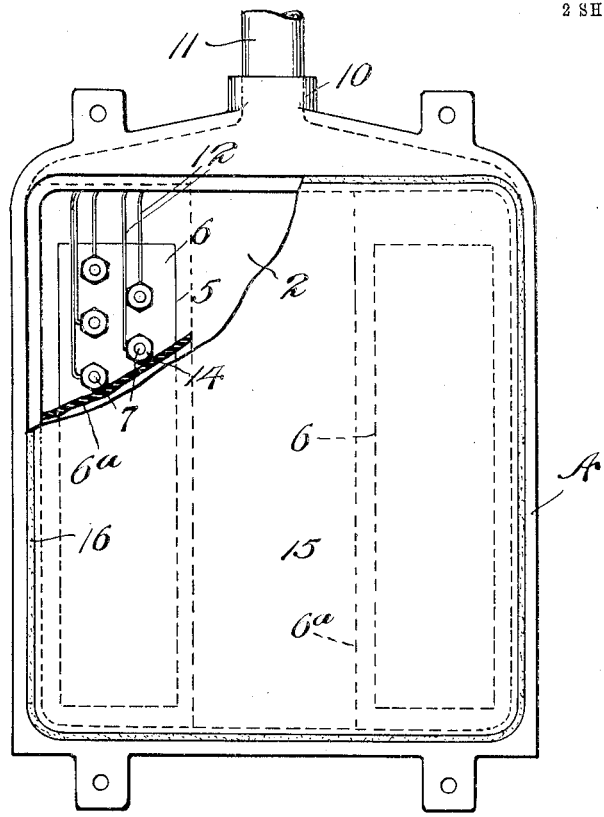
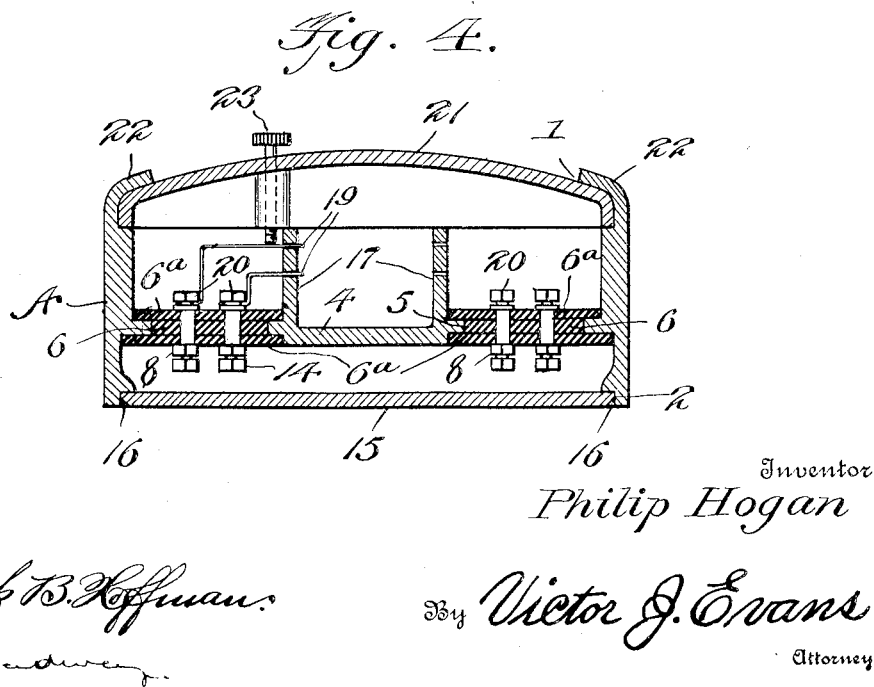
Witnesses
Frank B. Hoffman
Inventor
Philip Hogan
By Victor J. Evans
Attorney

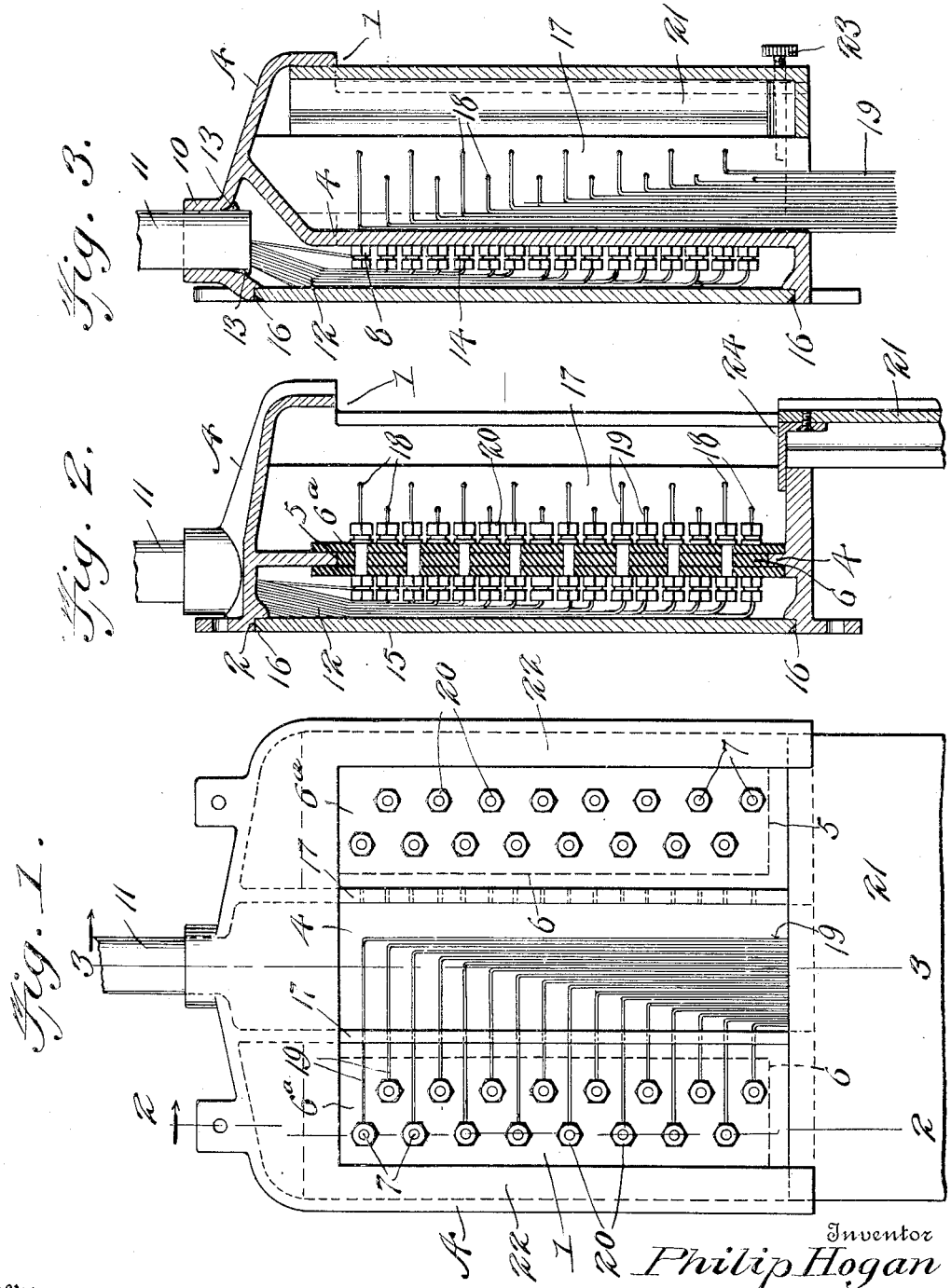

UNITED STATES PATENT OFFICE.

PHILIP HOGAN, OF BROOKLYN, NEW YORK.

TERMINAL BOX.

1,041,473.   Specification of Letters Patent.   Patented Oct. 15, 1912.

Application filed January 28, 1911. Serial No. 605,253.

*To all whom it may concern:*

Be it known that I, PHILIP HOGAN, a citizen of the United States, residing at Brooklyn, in the county of Kings and State of New York, have invented new and useful Improvements in Terminal Boxes, of which the following is a specification.

This invention relates to a terminal box used for distributing the individual wires of a telephone or other cable so as to connect the same with the service wires that lead to the various subscribers' telephones in the immediate vicinity of a box.

The invention has for one of its objects to improve and simplify the construction of devices of this character so as to be reliable and efficient in use, of comparatively inexpensive construction and of durable and substantial design.

Another object of the invention is to provide a box having ingoing and outgoing compartments divided by a partition, the ingoing compartment or the one into which the cable extends being moisture proof and having walls formed by the partition provided with wax or other insulation through which extends the binding posts that connect the cable wires to the service wires, the latter leading out of the other compartment of the box. The plates of insulation are held in openings in the partition and being spaced from the walls of the box they are not subjected to the hot rays of the sun and caused to soften and as a result the binding posts will retain their original position and always be effectively sealed and furthermore there will be no changing in the position of the cable wires so that danger of grounds being formed will be eliminated.

With these objects in view, and others as will appear as the description proceeds, the invention comprises the various novel features of construction and arrangement of parts which will be more fully described hereinafter and set forth with particularity in the claims appended hereto.

In the accompanying drawing, which illustrates one embodiment of the invention:—

Figure 1 is a front view of a box with a door opened. Fig. 2 is a vertical section on line 2—2 of Fig. 1. Fig. 3 is a vertical section on line 3—3 of Fig. 1. Fig. 4 is a horizontal section of the box. Fig. 5 is a rear view of the box partly broken away.

Similar reference characters are employed to designate corresponding parts throughout the several views.

Referring to the drawing A designates the casing of the terminal box which is preferably a lead casing, lead being selected because of the properties it possesses of resisting the action of the elements. The casing is a rectangular structure having an opening 1 at its front and an opening 2 at its back, the said openings being of such size as to permit of ready access to all portions of the interior of the casing so that the various circuit connections can be made. The casing is divided into ingoing and outgoing compartments by a vertical partition 4 that is parallel with the rear wall of the box. This partition is formed with rectangular vertically disposed openings 5 adjacent the sides of the box and in these openings is insulating material 6 which is poured therein when in a fluid state, the various binding posts or screws 7 being properly positioned in the openings 5 before the fluid insulation is poured into the openings. On each side of the partition are hard rubber or other insulating plates 6ª that are wider and longer than the openings and the insulating material is poured into the spaces between the said plates. The binding posts 7 pass through the retaining plates 6ª and serve to hold the latter in place. By applying the insulating plates or slabs in this manner moisture tight joints will be formed at the edges thereof and around the binding posts. On the binding posts are clamping nuts 8. At the top of the box is an opening 9 where a hollow boss 10 is formed and extending into this boss is a lead armored cable 11 which before being placed in the box has its insulation removed so that the individual wires 12 can be spread out in fan relation or divided into two groups. The armor of the cable extends into and snugly fits within the boss 10 and a water tight joint is formed at 13 by soldering the lead armor and the lead casing together. By this means moisture is prevented from entering the back compartment of the box. The wires 12 lead to the binding posts 7 and are clamped against the nuts on the rear end of the binding posts by nuts 14. After the wires are thus attached to the binding posts a back plate 15 is set into the opening 2 and this back plate which is also of lead is soldered to the shell or casing of the box so that a moisture proof joint at 16 will be formed.

Formed on the front side of the partition 4 are spaced vertically extending flanges 17 that are provided with pairs of apertures 18 through which extend the ends of the service wires 19, the said wires being fastened to the front end of the binding posts by nuts 20. These flanges 17 form a central chamber into which the service wires extend from the binding posts and the bottom of this chamber is opened so that the wires can be led outwardly and distributed to different points in the surrounding neighborhood where the wires are to connect with telephones and other instruments.

The front opening 1 is closed by a vertical sliding door 21 which slides behind the inwardly extending flanges 22 at the front of the casing and this door may be held in raised or closed position by a screw 23 passing through the bottom of the door and engaging the bottom of the casing as clearly shown in Fig. 3. At the top of the door is a laterally extending lug 24 that forms a stop for the opening or downward movement of the door by engaging the bottom of the casing as shown in Fig. 2.

The insulating material 6 is applied after the plates 6ª and the binding posts 7 are in position. Openings are made in suitable parts of the casing, preferably in the bottom so as to communicate with the spaces between the plates 6ª on opposite sides of the partition 4. The casing is then inverted so that the melted insulating material 6 can be poured into the openings 5 in such partition, and after the insulation solidifies, the openings are plugged and soldered.

From the foregoing description taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the claims.

What I claim as new and desire to secure by Letters-Patent is:—

1. A terminal box comprising a casing, a partition dividing the casing into separate compartments, said partition having an opening extending from one side to the other, plates of insulating material disposed against opposite sides of the partition, binding posts passing through the plates, insulating material filling the space between the plates, and wires leading into the said compartments and connected with the binding posts.

2. A terminal body comprising a casing, a partition dividing the casing into separate compartments, said partition having spaced flanges extending from one side and having openings between the flanges and the side walls of the casing, plates secured to the opposite sides of the partition and covering the openings, bolts passing through the plates to form binding posts, insulating material filling the openings in the partition, a cable extending into the compartment at the side of the partition opposite from that having the flanges and having its wires connected with the binding posts, and distributing wires in the other compartment and connected with the binding posts and extending through the said flanges to the chamber between the latter, the bottom of the chamber between the flanges being open for the outlet of the distributing wires.

In testimony whereof I affix my signature in presence of two witnesses.

PHILIP HOGAN.

Witnesses:
HENRY ZIPKIE,
R. C. HALLETT.